(12) United States Patent
Terao et al.

(10) Patent No.: US 7,971,990 B2
(45) Date of Patent: Jul. 5, 2011

(54) TRANSPORTED MEDIUM TRANSPORTING APPARATUS AND RECORDING APPARATUS

(75) Inventors: Takuya Terao, Shiojiri (JP); Hiroshi Hamakawa, Matsumoto (JP); Hiroshi Takeuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 979 days.

(21) Appl. No.: 11/832,783

(22) Filed: Aug. 2, 2007

(65) Prior Publication Data

US 2008/0030528 A1 Feb. 7, 2008

(51) Int. Cl.
*B41J 2/01* (2006.01)
*G01D 15/00* (2006.01)

(52) U.S. Cl. .................. 347/104; 346/134; 346/137

(58) Field of Classification Search .......... 347/101, 347/104; 346/134, 137
See application file for complete search history.

(56) References Cited

U.S. PATENT DOCUMENTS

| | | | | |
|---|---|---|---|---|
| 5,291,224 A * | 3/1994 | Asano et al. | .................. | 346/134 |
| 5,534,894 A * | 7/1996 | Hirano et al. | .................. | 346/134 |
| 5,606,357 A * | 2/1997 | Bekki | .................. | 347/104 |
| 6,299,367 B1 * | 10/2001 | Kawakami et al. | .................. | 400/634 |
| 6,554,417 B2 * | 4/2003 | Lin et al. | .................. | 347/104 |
| 6,619,658 B2 * | 9/2003 | Shiau | .................. | 271/274 |
| 7,410,315 B2 * | 8/2008 | Nakayama | .................. | 400/621 |
| 2003/0048345 A1 * | 3/2003 | Matsumoto | .................. | 347/104 |

FOREIGN PATENT DOCUMENTS

| | | |
|---|---|---|
| JP | 06-054353 | 2/1994 |
| JP | 09-142691 | 6/1997 |
| JP | 10-129910 | 5/1998 |
| JP | 2002-241009 | 8/2002 |
| JP | 2003-341871 | 12/2003 |
| JP | 2003-341872 | 12/2003 |
| JP | 2004-083216 | 3/2004 |
| JP | 2006-150785 | 6/2006 |

* cited by examiner

*Primary Examiner* — Daniel Petkovsek
(74) *Attorney, Agent, or Firm* — Maschoff Gilmore & Israelsen

(57) ABSTRACT

A transported medium transporting apparatus includes a transported medium transporting device and at least one pressing driven roller. The transported medium transporting device transports a transported medium in a predetermined transportation direction. The pressing driven roller is driven so that the pressing driven roller contacts one surface of the transported medium, which is transported by the transported medium transporting device. The pressing driven roller includes a rotary body and a shaft portion, both of which are made of elastic synthetic resin and formed integrally with each other. A plurality of protrusions are formed on the rotary body at regular intervals in a circumferential direction of the rotary body. The shaft portion rotatably supports the rotary body so that the rotary body can be driven. The pressing driven roller has a shape such that the rotary body contacts the transported medium with a predetermined pressing force owing to an elastic force of the shaft portion.

4 Claims, 9 Drawing Sheets

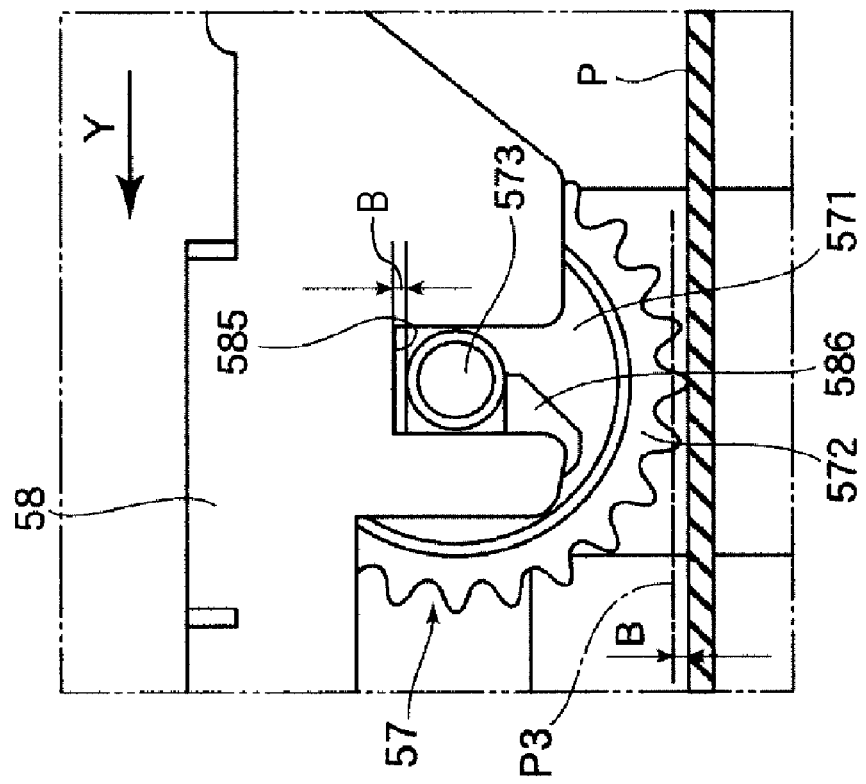
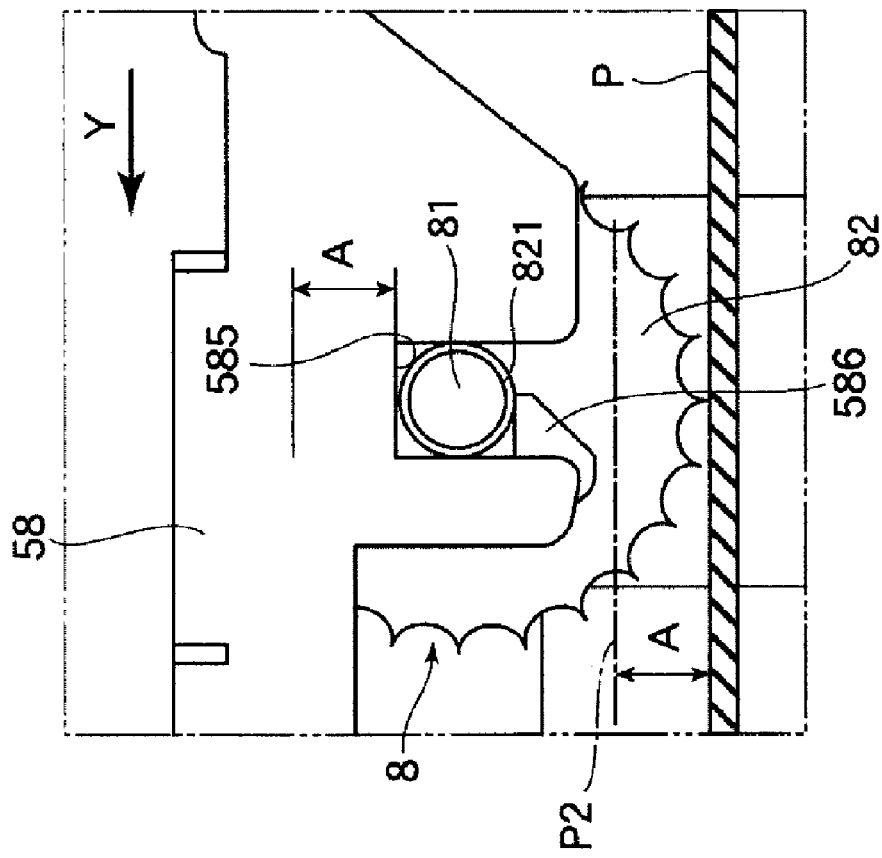
FIG. 4A
FIG. 4B

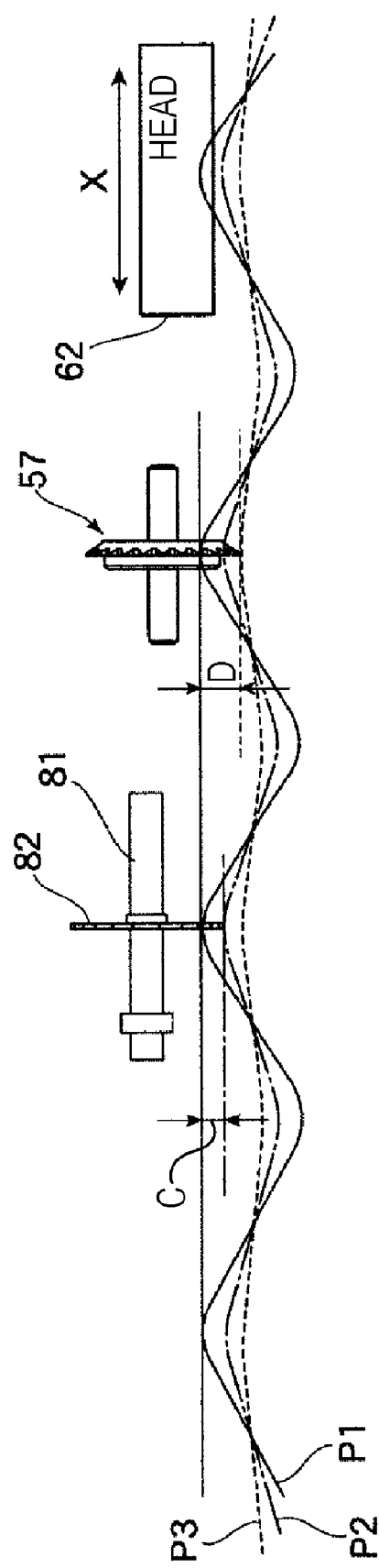

TRANSPORTED MEDIUM TRANSPORTING APPARATUS AND RECORDING APPARATUS

BACKGROUND

1. Technical Field

The present invention relates to a transported medium transporting apparatus that is provided with a transported medium transporting device that transports a transported medium in a predetermined transportation direction and also to a recording apparatus that is provided with a record performing device that performs recording on a record surface of a recording medium in a transportation path along which a recording medium transporting device transports the recording medium in a predetermined transportation direction.

2. Related Art

Here, the transported medium transporting apparatus is provided for a liquid ejecting apparatus. The liquid ejecting apparatus includes not only a recording apparatus, such as an ink jet recording apparatus, a photocopier, or a facsimile machine, that ejects ink from a recording head serving as a liquid ejecting head to record images on a recording medium, such as a recording paper, but also an apparatus that ejects a liquid corresponding to an intended purpose, instead of ink, from a liquid ejecting head, which corresponds to the above-mentioned recording head, onto a liquid ejected medium corresponding to the recording medium, to attach liquid to the liquid ejected medium. In addition to the recording head, the liquid ejecting head can be a color material ejecting head used for manufacturing a color filter for a liquid crystal display, an electrode material (conductive paste) ejecting head used for forming an electrode for an organic EL display or a field emission display (FED), a bio-organic material ejecting head used for manufacturing a bio-chip, or a sample ejecting head that ejects a sample as a precision pipette.

A known ink jet printer as an example of the recording apparatus or the liquid ejecting apparatus is configured to perform recording by ejecting ink from a recording head onto a record surface of a recording medium such as a recording paper. In this type of ink jet printer, there is a problem that ink that has ejected onto a recording medium is absorbed into the recording medium, causing a so-called cockling phenomenon to occur. This cockling phenomenon is a phenomenon that a portion of a recording medium that has absorbed ink is extended and, as a result, the recording medium is wavily deformed. The wavily deformed recording medium is lifted from a slide contact support surface of a transportation guide member such as a platen and then may possibly be made to contact a recording head that forms a record performing device, which is a so-called head rubbing.

An example of existing art that solves such a problem is known as a paper discharging apparatus of an ink jet printer, in which a paper pressing star wheel having serrate teeth on its periphery is held by a shaft formed of an elastic linear shaft and is arranged downstream of a discharge device that discharges a recording medium, on which recording has been performed, in a transportation direction of the recording medium. Since this paper pressing star wheel presses a recording medium that has been discharged while being wavily deformed into a curled shape by absorbing large amount of ink, it is possible to reduce a curled wavy deformation of the recording medium, which is, for example, described in Japanese Unexamined Patent Application Publication No. 10-129910.

For example, as described in the above publication No. 10-129910, an existing pressing driven roller includes two components, that is, an elastic linear shaft such as a torsion bar and a star wheel that is rotatably supported by the elastic linear shaft. The thus configured pressing driven roller requires assembling a thin and short elastic linear shaft, such as a torsion bar, that is manually inserted into a shaft receiving hole of a small star wheel, to the frame of a printer body, or the like. For this reason, assembling work requires a skill and also needs much working time, and, hence, there has been a problem that the assembling work is not efficient.

In addition, the thus configured pressing driven roller is configured so that a star wheel that is rotatably supported by an elastic linear shaft such as a torsion bar is made to contact a recording medium while being driven in accordance with transportation of the recording medium, so that rattling occurs due to a small gap between the inner peripheral surface of the shaft receiving hole of the star wheel and the outer peripheral surface of the elastic linear shaft such as a torsion bar. Then, due to the rattling, the star wheel that is in contact with the recording medium may possibly be inclined slightly relative to the elastic linear shaft such as a torsion bar. In such a state, the star wheel that is driven in a transportation direction while being in contact with the recording medium experiences an irregularly fluctuated rotational resistance, so that the star wheel is driven unstably. Because of this, there may be a problem that the teeth of the star wheel damage the record surface of the recording medium that has been recorded to thereby deteriorate a recording image quality.

Furthermore, an existing pressing driven roller is generally set to have a pressing force generated by an elastic linear shaft such as a torsion bar as small as possible in order to prevent the teeth of the star wheel as much as possible from damaging the record surface of the recording medium that has been recorded due to the above unstable driving of the star wheel. Therefore, in a recent recording apparatus for which various types of recording medium are used, there may be a case that, when recording is performed on a recording medium such as a photo paper, having a relatively high rigidity, it is sometimes difficult to sufficiently suppress the recording medium from lifting due to wavy deformation of the recording medium because of the cockling phenomenon, or the like. Thus, there may possibly be a problem such as head rubbing.

SUMMARY

An advantage of some aspects of the invention is that it provides a pressing driven roller that is easy to assemble and less likely to have a problem with head rubbing, or the like, caused by wavy deformation of a recording medium due to a cockling phenomenon and that is less likely to damage a record surface of the recording medium that has been recorded.

A first aspect of the invention provides a transported medium transporting apparatus. The transported medium transporting apparatus includes a transported medium transporting device and at least one pressing driven roller. The transported medium transporting device transports a transported medium in a predetermined transportation direction. The pressing driven roller is driven so that the pressing driven roller contacts one surface of the transported medium, which is transported by the transported medium transporting device. The pressing driven roller includes a rotary body and a shaft portion, both of which are made of elastic synthetic resin and integrally formed with each other. A plurality of protrusions are formed on the rotary body at regular intervals in a circumferential direction of the rotary body. The shaft portion rotatably supports the rotary body so that the rotary body can be driven. The pressing driven roller has a shape such that the rotary body contacts the transported medium with a predetermined pressing force owing to an elastic force of the shaft portion.

Thus, the pressing driven roller of the transported medium transporting apparatus according to the first aspect of the invention includes the rotary body and the shaft portion that rotatably supports the rotary body so that the rotary body can be driven, wherein both the rotary body and the shaft portion are made of elastic synthetic resin and formed integrally with each other. Therefore, because it is unnecessary to assemble a thin and short elastic linear shaft, such as a torsion bar, when manually inserted in the shaft receiving hole of a small star wheel according to the known art and it is possible to simply assemble the pressing driven roller, it is possible to improve assembling work.

In addition, because the rotary body and the shaft portion that rotatably supports the rotary body so that the rotary body can be driven are made of elastic synthetic resin and are formed integrally with each other, the pressing driven roller of the transported medium transporting apparatus according to the first aspect of the invention is not likely to be driven in a state where the rotary body is supported by a support shaft in an inclined attitude. Therefore, the rotational resistance of the rotary body is not likely to unstably fluctuate, and it is possible to allow the rotary body to be driven stably. Thus, it is possible to reduce a possibility that the surface of a transported medium, that is, the record surface of a recording medium that has been recorded, is damaged.

Furthermore, because the pressing driven roller of the transported medium transporting apparatus according to the first aspect of the invention has the plurality of protrusions formed at regular intervals on the outer peripheral surface of the rotary body, it is possible to reduce the area in which the rotary body contacts the record surface of the recording medium that has been recorded to a large degree. By so doing, it is possible to reduce a possibility that the record surface that has been recorded is damaged in the area in which the rotary body contacts the record surface that has been recorded. In addition, because the entire pressing driven roller is made of synthetic resin, it is easy to form the shape of the distal end of each protrusion formed on the outer peripheral surface of the rotary body into a smoother shape that is less likely to be engaged.

Furthermore, because the pressing driven roller of the transported medium transporting apparatus according to the first aspect of the invention may allow the rotary body to be stably driven as described above, it is unnecessary to set a pressing force as small as possible in order to prevent the record surface from being damaged by the star wheel that rotates unstably as in the case of the known art. Therefore, because it is possible to rigidly restrict the lifting of the recording medium with a pressing force that is larger than that of the known art, it is possible to reduce a possibility that wavy deformation of the recording medium causes head rubbing to occur due to a cockling phenomenon.

In this manner, according to the pressing driven roller of the transported medium transporting apparatus of the first aspect of the invention, it is advantageous in that assembling work will be easy in the recording medium transporting device that transports a recording medium in a predetermined transportation direction and a record performing device that performs recording on a record surface of the recording medium that is placed in a transportation path along which the recording medium transporting device transports the recording medium, head rubbing, or the like, caused by wavy deformation of a recording medium due to a cockling phenomenon, or the like, is less likely to occur, and it is less likely to damage the record surface of a recording medium that has been recorded.

A second aspect of the invention may provide a recording apparatus that is provided with the transported medium transporting apparatus according to the first aspect. The recording apparatus includes a recording medium transporting device and a record performing device. The recording medium transporting device transports a recording medium in a predetermined transportation direction. The record performing device performs recording on a record surface of the recording medium that is placed in a transportation path along which the recording medium transporting device transports the recording medium. According to the recording apparatus of the second aspect of the invention, the same advantageous effects as those in the case of the first aspect may be obtained in the recording apparatus that includes a recording medium transporting device that transports a recording medium in a predetermined transportation direction and a record performing device that performs recording on a record surface of the recording medium that is placed in a transportation path along which the recording medium transporting device transports the recording medium.

A third aspect of the invention may provide a recording apparatus in which, in addition to the recording apparatus of the second aspect, the pressing driven roller is arranged between a record performing region where the record performing device performs recording and a discharge device that discharges the recording medium that has been recorded. Thus, when the pressing driven roller is arranged between the record performing region where the record performing device performs recording and the discharge device that discharges the recording medium that has been recorded, it is possible to prevent the distal end of the recording medium that has been recorded from lifting due to a cockling phenomenon before the distal end of the recording medium that is transported by the recording medium transporting device, when recording being performed, reaches the paper discharge device.

A fourth aspect of the invention may provide a recording apparatus in which, in addition to the recording apparatus according to the second aspect or third aspect, a plurality of the pressing driven rollers are arranged at predetermined intervals in a direction perpendicular to the transportation direction of the recording medium and are arranged at corresponding positions that contact crests of waves of the wavy deformation of the recording medium, which are formed due to a cockling phenomenon, or the like, in a direction perpendicular to the transportation direction of the recording medium. Thus, when the pressing driven rollers are arranged at positions corresponding to the crests of waves of the wavy deformation of the recording medium due to a cockling phenomenon, or the like, it is possible to effectively reduce the recording medium from lifting due to the cockling phenomenon, or the like.

BRIEF DESCRIPTION OF THE DRAWINGS

The invention will be described with reference to the accompanying drawings, wherein like numbers reference like elements.

FIG. 4A and FIG. 4B are views, each of which shows a state where the pressing driven roller engages a recording paper.

FIG. 5 is a view showing a state where the pressing driven roller restricts wavy deformation of the recording paper.

DESCRIPTION OF EXEMPLARY EMBODIMENTS

Hereinafter, embodiments of the invention will be described with reference to the accompanying drawings. A schematic configuration of an ink jet recording apparatus, which is an example of a transported medium transporting apparatus and a recording apparatus according to the invention, will be described.

Figure 1:
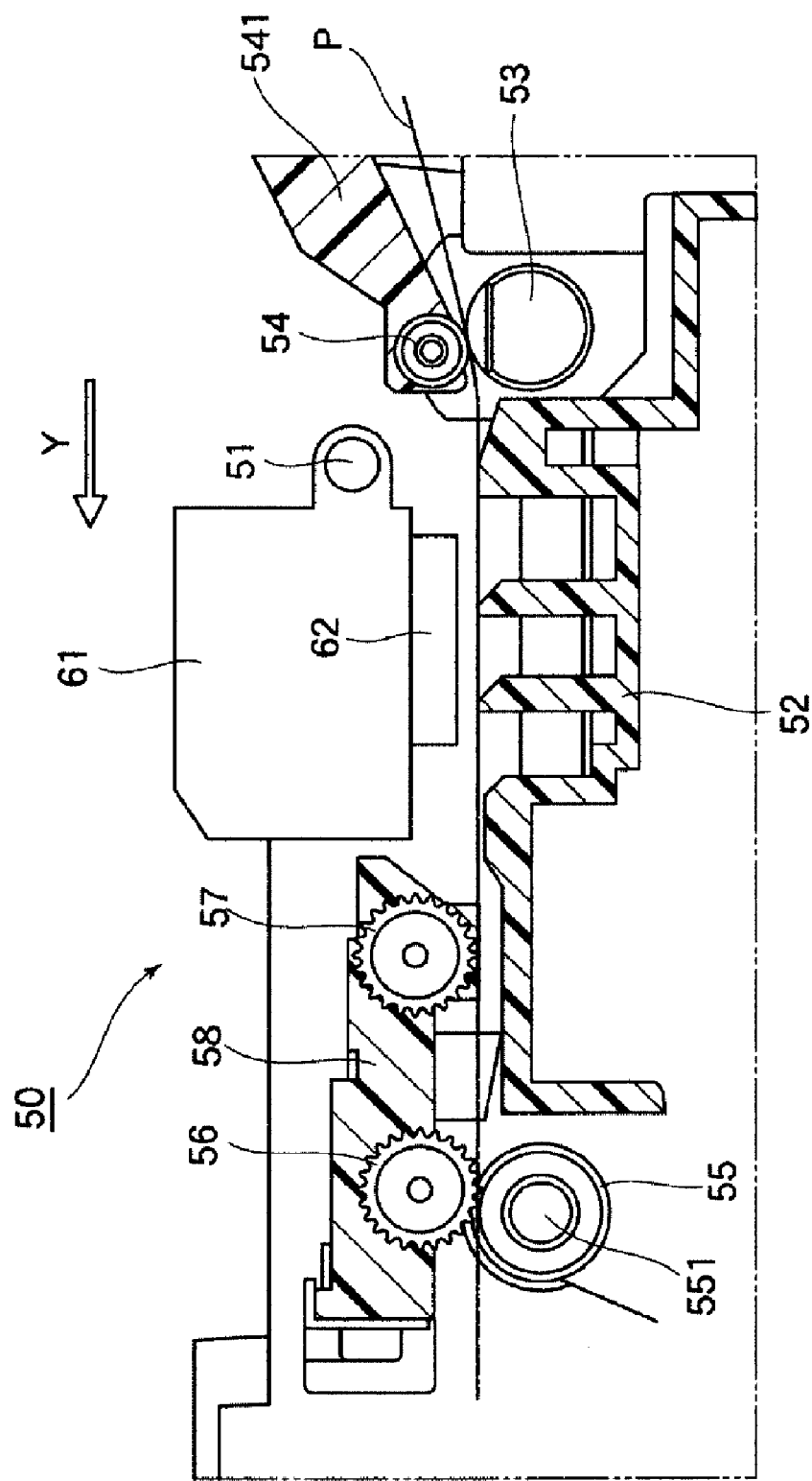
FIG. 1 is a schematic side view of an ink jet recording apparatus according to an embodiment of the invention.

FIG. 1 is a side view of a relevant part of an ink jet recording apparatus according to an embodiment of the invention. An ink jet recording apparatus 50 includes a transport drive roller 53 and a transport driven roller 54, which may be regarded as a recording medium (liquid ejected medium) transporting device that transports a recording paper P, which may be regarded as a recording medium (liquid ejected medium), in a predetermined transportation direction (auxiliary scanning direction Y). The transport drive roller 53 is coated with a film having a high frictional resistance on its outer peripheral surface. Rotational driving force of a PF motor (not shown) is transmitted through gears, and the transport drive roller 53 is then rotated. A plurality of the transport driven rollers 54 are rotatably supported by a transport driven roller holder 541 so that they can be driven, and are respectively pressed toward the transport drive roller 53 by means of a pressing device (not shown). A recording paper P that is automatically fed from a sheet feeder (not shown) is pressed against the outer peripheral surface of the transport drive roller 53 by the transport driven rollers 54 and is closely adhered to the outer peripheral surface of the transport drive roller 53 owing to the frictional resistance of the outer peripheral surface. The recording paper P is then transported in the auxiliary scanning direction by means of rotation of the transport drive roller 53. Then, the transport driven rollers 54 press the recording paper P so as to contact the outer peripheral surface of the transport drive roller 53 while being driven by transportation of the recording paper P.

The ink jet recording apparatus 50 includes a recording head 62 that serves as a record performing device that performs recording on a record surface of the recording paper P placed in a transportation path along which the recording paper P is transported by the transport drive roller 53 and the transport driven rollers 54. The recording head 62 ejects ink onto the recording paper P to perform recording. The recording head 62 is provided on a carriage 61 that is pivotally supported by a carriage guide shaft 51 so that the carriage 61 is reciprocally movable in a main scanning direction (a direction perpendicular to the auxiliary scanning direction Y and parallel to the record surface of the recording paper P). The recording head 62 is mounted on the carriage 61 so that the record surface of the recording paper P that is transported on the platen 52 by the transport drive roller 53 and the transport driven rollers 54 is spaced apart from and opposed to a head surface with a predetermined clearance. The carriage 61 is configured to reciprocally move in the main scanning direction through rotational driving force of a CR motor (not shown) being transmitted by means of a belt transmitting mechanism (not shown).

The ink jet recording apparatus 50 includes a paper discharge drive roller 55 and a paper discharge driven roller 56, which cooperatively serve as a paper discharge device, that discharge a recording paper P that has been recorded. A plurality of the paper discharge drive rollers 55 are provided on a paper discharge drive shaft 551 that is rotated by means of rotational driving force of the PF motor (not shown) being transmitted through gears. A plurality of the paper discharge driven rollers 56 are provided at positions corresponding to the paper discharge drive rollers 55. The paper discharge driven rollers 56 are rotatably supported by a paper discharge driven roller holder 58 so as to be driven. Each of the paper discharge driven rollers 56 has a plurality of protrusions that are formed on the outer peripheral surface thereof at regular intervals in the circumferential direction. The distal ends of the protrusions contact the record surface of the recording paper P that has been recorded and press the recording paper P toward the paper discharge drive roller 55. Owing to the rotation of the paper discharge drive rollers 55, the recording paper P that has been recorded is discharged in the auxiliary scanning direction Y. The plurality of paper discharge driven rollers 56 are separately pressed against the paper discharge rollers 55 by means of a pressing device (not shown). When the recording paper P is discharged by means of rotation of the paper discharge drive rollers 55, the paper discharge driven rollers 56 contact the recording paper P and rotates to follow the discharge of the recording paper P.

In addition, a pressing driven roller 57 according to the aspect of the invention as shown in the drawing is arranged in the transportation path between a record performing region, in which ink is ejected from the recording head 62 that is mounted on the carriage 61 that reciprocally moves in the main scanning direction, and sets of the paper discharge drive rollers 55 and the paper discharge driven rollers 56. The pressing driven roller 57 is rotatably supported by the paper discharge driven roller holder 58 so as to be driven in the transportation direction of the recording paper P (auxiliary scanning direction Y). The pressing driven roller 57 contacts a portion of the record surface of the recording paper P that has been recorded (a portion to which ink has been ejected) and is driven as the recording paper P is transported by the transport drive rollers 53, the transport driven rollers 54, the paper discharge drive rollers 55 and the paper discharge driven rollers 56 in the auxiliary scanning direction Y while pressing to restrict the attitude of the recording paper P so as to suppress lifting of the recording paper P due to a cockling phenomenon.

In the thus configured ink jet recording apparatus 50, a recording control portion (not shown) controls driving of the PF motor (not shown) that drives to rotate the transport drive rollers 53 and the paper discharge drive rollers 55 and driving of the CR motor (not shown) that drives the carriage 61 in the main scanning direction. In addition, the recording control portion also controls driving of the recording head 62 to eject ink onto the surface of the recording paper P. The recording control portion alternately repeats operation to reciprocally move the carriage 61 in the main scanning direction and eject ink from the recording head 62 onto the recording paper P and operation to transport the recording paper P in the auxiliary scanning direction Y by a predetermined amount of transportation while executing a control to perform recording on the recording paper P.

The pressing driven roller 57 according to the embodiment of the invention will now be described in comparison with a known pressing driven roller that includes two components, that is, a star wheel and a torsion bar.

Figure 2:
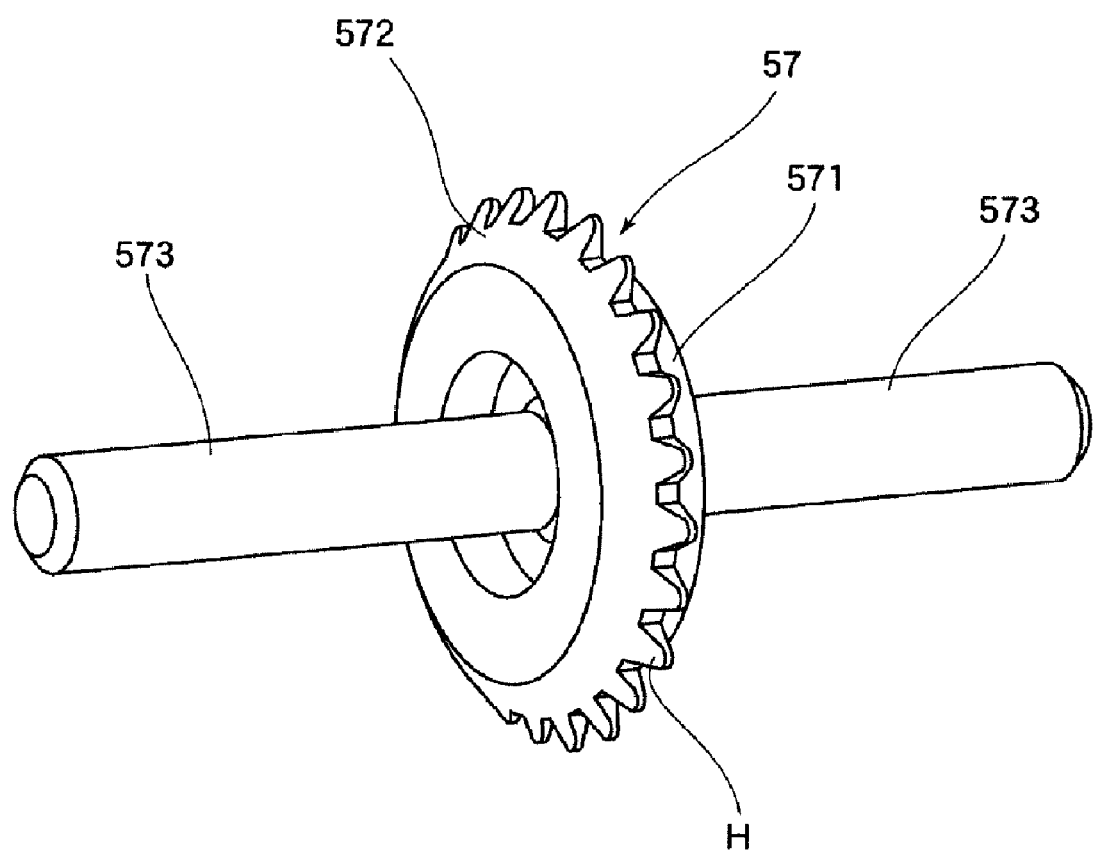
FIG. 2 is an exterior perspective view showing a first embodiment of a pressing driven roller.
Figure 3:
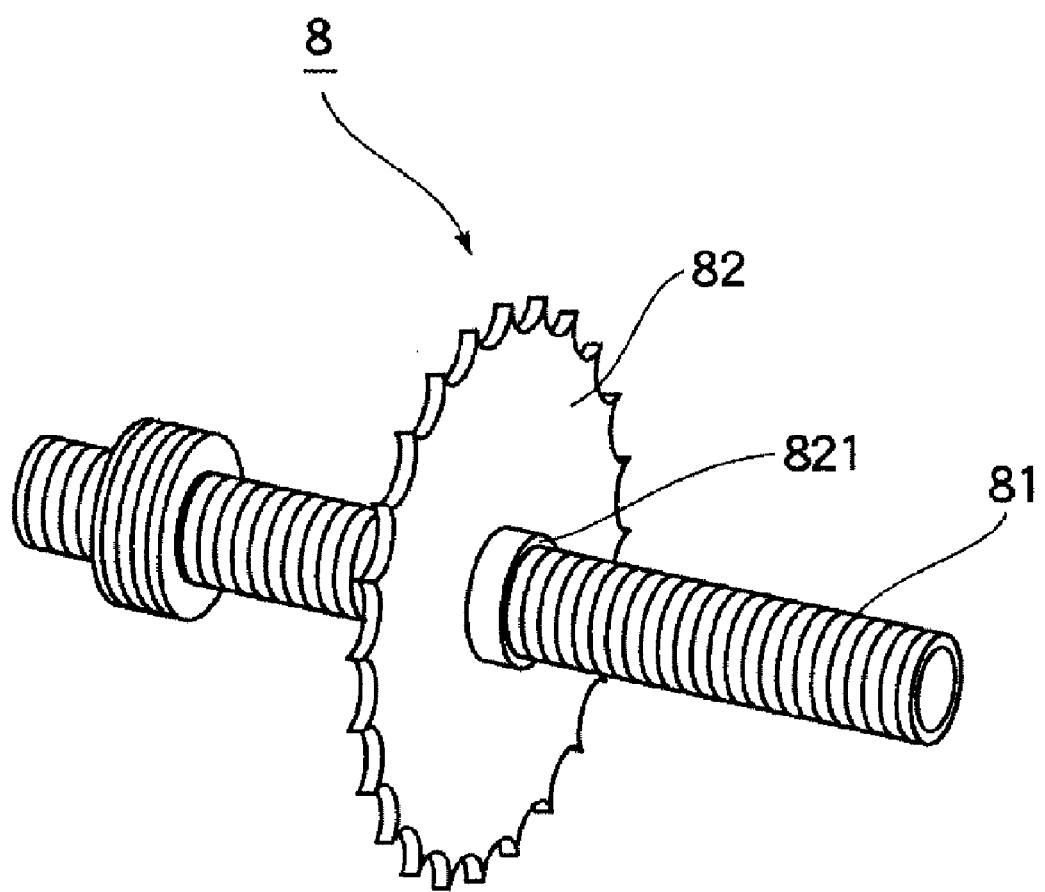
FIG. 3 is a perspective view of a general pressing driven roller according to the known art.

FIG. 2 is an exterior perspective view showing a first embodiment of the pressing driven roller 57. FIG. 3 is a perspective view of a general pressing driven roller 8 according to the known art. The pressing driven roller 57 (see FIG. 2) according to the embodiment of the invention includes a rotary body 571 and a shaft portion 573 that rotatably supports the rotary body 571 so as to be driven, both of which are made of elastic synthetic resin and formed integrally with each other. The pressing driven roller 57 has a shape such that the distal ends of a plurality of teeth (protrusions) H formed at a toothing 572 that partially forms the rotary body 571 contact the recording paper P with a predetermined pressing force owing to the elastic force of the shaft portion 573. A synthetic resin used to form the pressing driven roller 57 is selected so that the pressing driven roller 57, when assembled to the ink jet recording apparatus 50, contacts the recording paper P in the transportation path with a desired pressing force. The shape of the pressing driven roller 57, particularly, the length, the thickness, the shape, or the like, of the shaft portion 573, is set.

Note that the synthetic resin may preferably be, for example, commodity plastics, such as polyacetal (POM) polyvinyl chloride (PVC), polyethylene (PE), polypropylene (PP), polystyrene (PS), polyvinylidene chloride, polyvinyl acetate, fluoroplastic; however, it is needless to say that, as long as the synthetic resin allows the pressing driven roller 57 to be integrally formed, the invention may be implemented even when any synthetic resin is selected.

On the other hand, the general pressing driven roller 8 (see FIG. 3) according to the known art is formed of two components, that is, a general torsion bar 81 made of a metal member and a star wheel 82 formed by pressing a stainless member, or the like. The thus configured general pressing driven roller 8 according to the known art, when the torsion bar 81 is manually inserted in a shaft receiving hole 821 of the star wheel 82, is assembled to the paper discharge driven roller holder 58 (see FIG. 1), or the like, of the ink jet recording apparatus 50 and then arranged in the transportation path of the recording paper P.

FIG. 4A and FIG. 4B are views, each of which shows a state where the pressing driven roller, when assembled to the paper discharge driven roller holder 58 of the ink jet recording apparatus 50, engages the recording paper P in the transportation path. FIG. 4A shows a state where both ends of the torsion bar 81 of the pressing driven roller 8 according to the known art is assembled by fixing the shaft portions with engaging portions 586. FIG. 4B shows a state where both ends of the shaft portion 573 of the pressing driven roller 57 according to the embodiment of the invention are rotatably supported with a certain amount of clearance formed in recesses 585 by means of the engaging portions 586 so as to be driven. Note that the recesses 585 and the engaging portions 586 are provided at positions corresponding to both ends of the one pressing driven roller so that the pressing driven roller is rotatably supported. FIG. 5 shows a state where the pressing driven roller restricts wavy deformation of the recording paper P due to a cockling phenomenon in contrast between the pressing driven roller 57 according to the embodiment of the invention and the pressing driven roller according to the known art.

As described above, the generally known pressing driven roller 8 is configured to set a pressing force of the torsion bar 81 as small as possible to reduce a possibility that the teeth ends of the star wheel 82 damage the record surface of the recording paper P that has been recorded due to an unstable driving of the star wheel 82. Therefore, when recording is performed to the recording paper P having a relatively high rigidity, the pressing driven roller 8 is displaced in a lifting direction by a large amount indicated by the reference sign A (see FIG. 4A) relative to a recording paper P1 in which the wavy deformation has occurred due to a cockling phenomenon. Thus, the lifting of the recording paper P1 in which the wavy deformation has occurred due to a cockling phenomenon may be pressed down only by an amount indicated by the reference sign C, and the lifting cannot be sufficiently suppressed (a recording paper P2 shown in FIG. 4A and FIG. 5). Thus, there still exists a possibility that head rubbing, that is, the recording paper P2 that has wavy deformation contacts the head surface of the recording head 62, occurs (see FIG. 5).

In contrast to such a known art, because the pressing driven roller 57 according to the embodiment of the invention includes the rotary body 571 and the shaft portion 573 that rotatably supports the rotary body 571 so as to be driven, which are made of elastic synthetic resin and formed integrally with each other, the rotary body 571 is not driven in a state where the rotary body 571 is inclined relative to a support shaft. For this reason, there is a little possibility that the rotational resistance of the rotary body 571 irregularly fluctuates, and it is possible to perform stable driving of the rotary body 571. In this manner, it is possible to reduce a possibility that the record surface of the recording paper P that has been recorded is damaged.

In addition, because the pressing driven roller 57 according to the embodiment of the invention can make the rotary body 571 drive stably as described above, it is unnecessary to set a pressing force of the torsion bar 81 as small as possible in order to prevent the record surface of the recording paper P from being damaged by the distal ends of the teeth of the star wheel 82 that rotates unstably as in the case of the known art. Thus, it is possible to rigidly restrict the recording paper P1, which has wavy deformation due to a cockling phenomenon, with a pressing force that is larger than that of the known art. Accordingly, it is possible to restrict wavy deformation with a force that sufficiently withstand the lifting force of the recording paper P that has wavy deformation due to the cockling deformation, and, hence, the amount of displacement indicated by the reference sign B is also smaller than that of the pressing driven roller 8 according to the known art.

In this manner, the pressing driven roller 57 according to the embodiment of the invention is capable of pressing the lifting of the recording paper P1, that has wavy deformation due to a cockling phenomenon, down to the level indicated by the reference sign D, so that it is possible to suppress the lifting within an allowable range (recording paper P3 shown in FIG. 4B and FIG. 5). Thus, it is possible to effectively reduce a possibility that head rubbing, or the like, in which the head surface of the recording head 62 contacts the recording paper P1 that has wavy deformation, occurs (see FIG. 5).

As described above, according to the pressing driven roller 57 of the embodiment of the invention, it is possible to reduce a possibility that head rubbing, or the like, which is caused by wavy deformation of the recording paper P due to a cockling phenomenon, occurs, and it is also possible to effectively reduce a possibility that the record surface of the recording paper P that has been recorded is damaged. In addition, it is unnecessary to assemble the torsion bar 81 when manually inserted in the shaft receiving hole 821 of the star wheel 82 as in the case of the known pressing driven roller 8, and it is possible to simply assemble the pressing driven roller 57, so that it is possible to improve assembling work.

Furthermore, because the pressing driven roller 57 according to the embodiment of the invention has a shape such that the distal ends of the plurality of teeth (protrusions) H formed in the toothing 572 that partially forms the rotary body 571 contacts the recording paper P with a predetermined pressing force, it is possible to effectively reduce the area in which the rotary body 571 contacts the record surface of the recording paper P that has been recorded. Thus, it is possible to reduce a possibility that the record surface that has been recorded is damaged in the area in which the rotary body 571 contacts the record surface. Furthermore, because the entire pressing driven roller 57 is formed of synthetic resin, it is easy to form the shape of the distal end of each tooth (protrusion) H provided on the outer peripheral surface of the rotary body 571 into a smoother shape that is less likely to be engaged.

Moreover, in the ink jet recording apparatus 50 according to the embodiment of the invention, the pressing driven roller 57 is arranged in the transportation path between the record performing region in which ink is ejected from the recording head 62 and the sets of the paper discharge drive rollers 55 and the paper discharge driven rollers 56. Thus, before the distal end of the recording paper P that is performing recording reaches a point where it is pinched by the paper discharge drive rollers 55 and the paper discharge driven rollers 56 as well, it is possible to prevent the distal end of the recording paper P that has been recorded from lifting due to a cockling phenomenon.

Then, in the ink jet recording apparatus 50 according to the invention, it is preferable that a plurality of the pressing driven rollers 57 are arranged at predetermined intervals in the main scanning direction X and, as shown in FIG. 5, the pressing driven rollers 57 are arranged at corresponding positions so as to contact the crests of waves of wavy deformation of the recording paper P, which are formed due to a cockling phenomenon over the main scanning direction X. That is, when the pressing driven rollers 57 are arranged at positions corresponding to the crests of the wavy deformation of the recording paper P due to a cockling phenomenon, it is possible to effectively reduce the recording paper P from lifting due to a cockling phenomenon.

Figure 6:
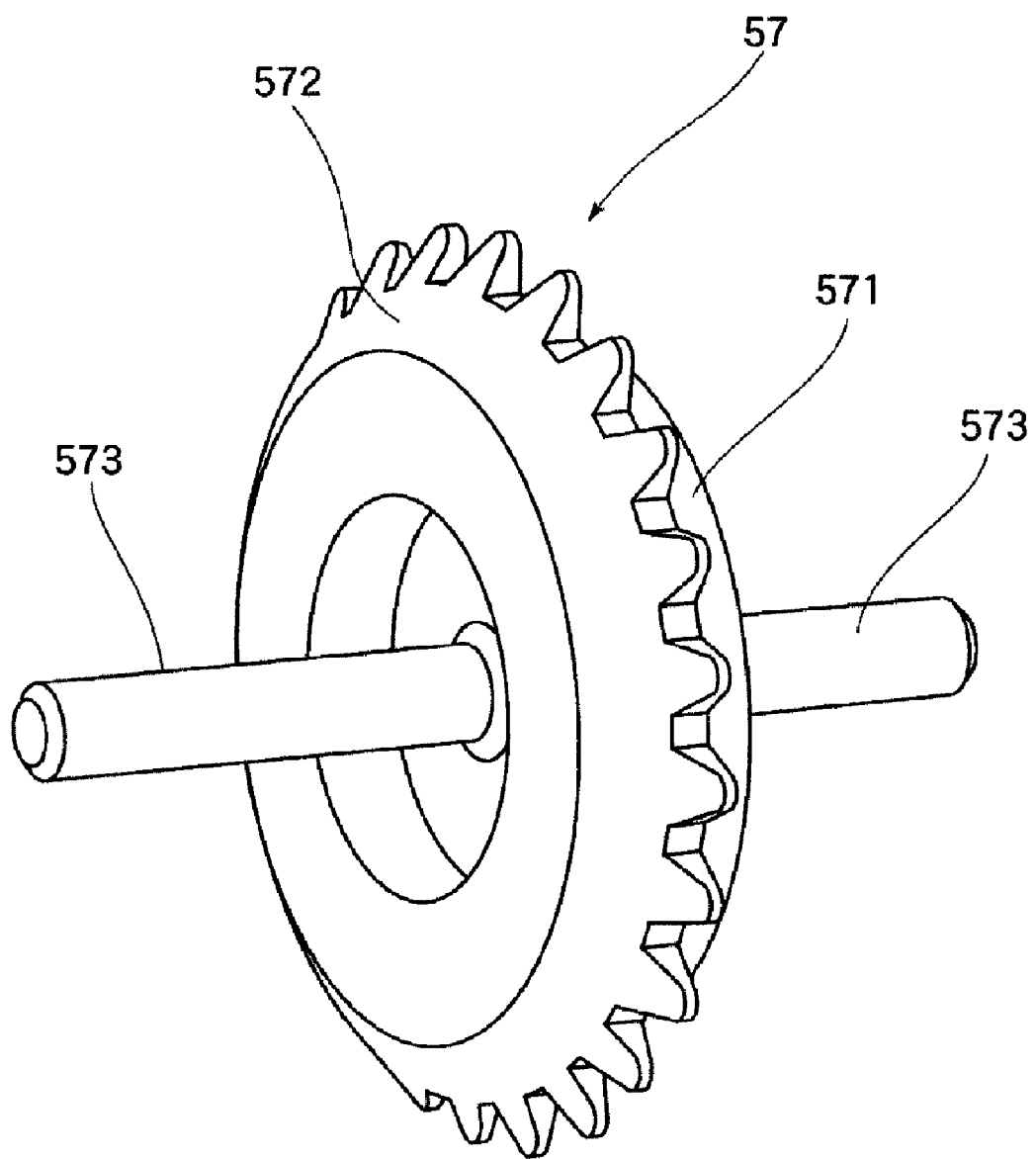
FIG. 6 is an exterior perspective view showing a second embodiment of a pressing driven roller.

FIG. 6 is a perspective view showing a pressing driven roller 57 according to a second embodiment of the invention. The pressing driven roller 57 according to the second embodiment has a shaft portion 573 that is shorter in length and smaller in diameter than that of the first embodiment (FIG. 2). The overall elasticity of the shaft portion 573 becomes smaller the shorter the shaft portion 573 is. However, by reducing the diameter of the shaft portion 573 by an amount corresponding to the shortened length, it is possible to obtain a pressing force in the substantially same degree as that of the first embodiment. In this manner, it is possible to reduce the length (longitudinal width) of the pressing driven roller 57, and it is possible to improve, for example, an efficiency at which the pressing driven rollers 57 are mounted.

Figure 7:
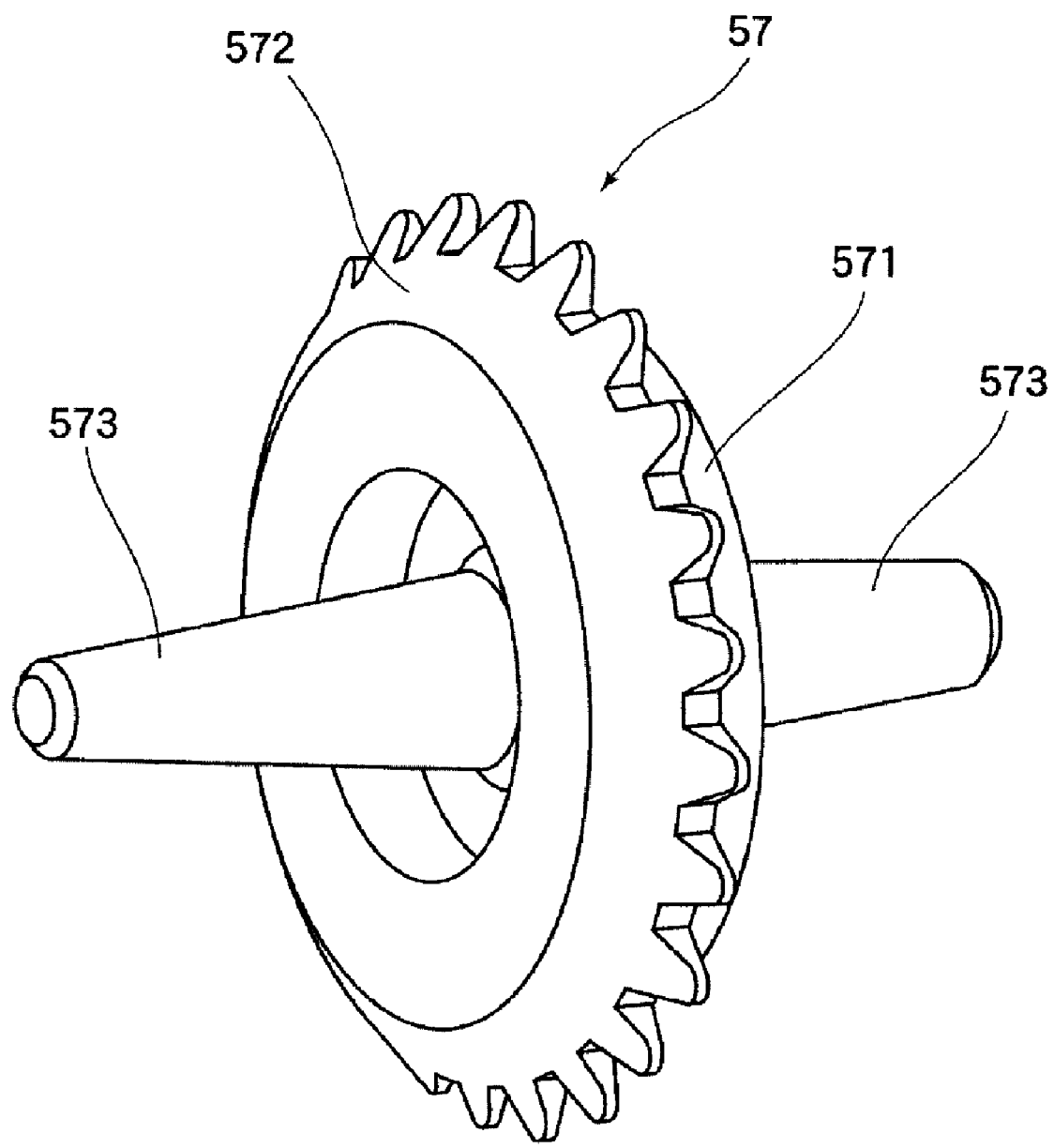
FIG. 7 is an exterior perspective view showing a third embodiment of a pressing driven roller.
Figure 8:
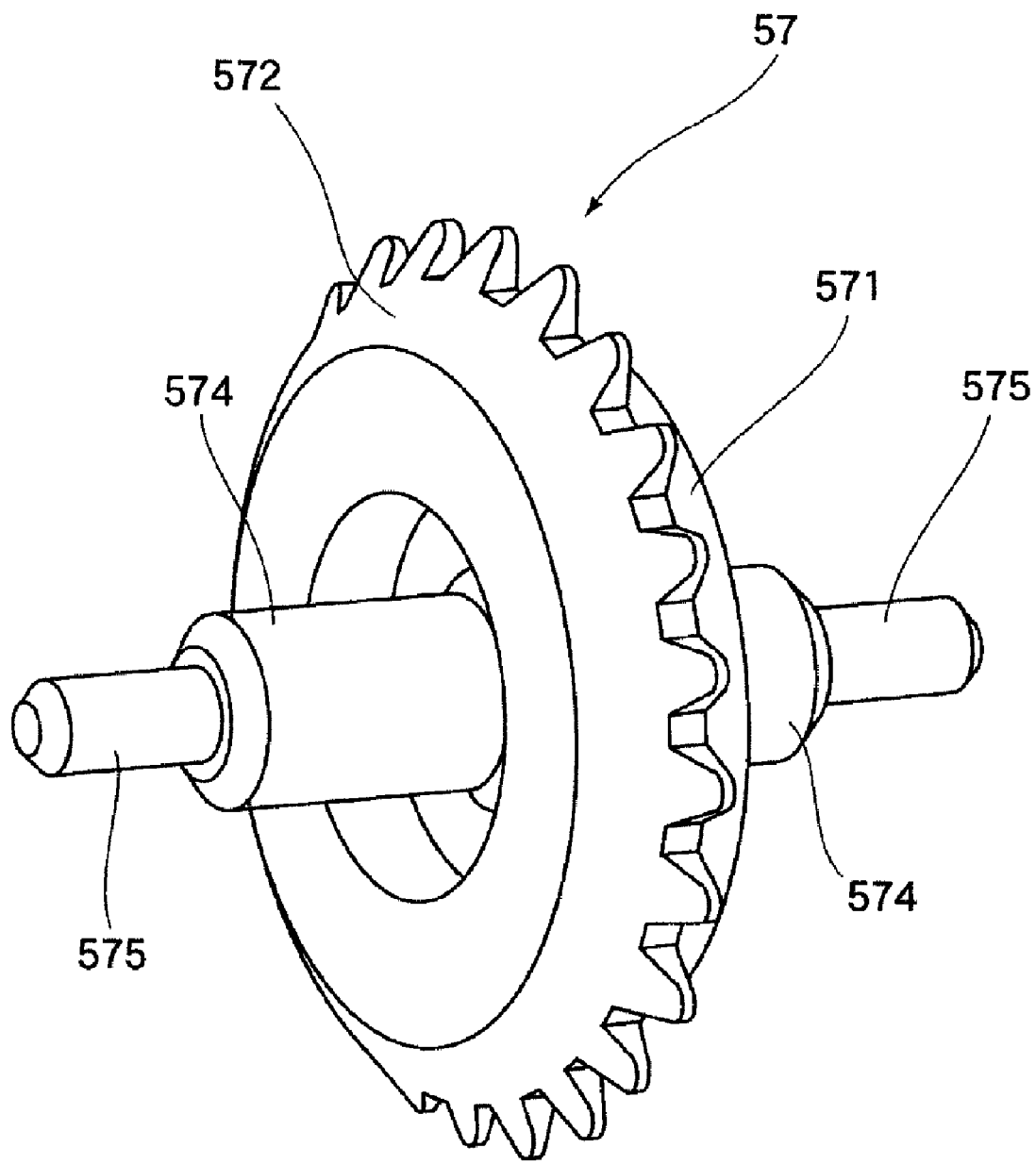
FIG. 8 is an exterior perspective view of a fourth embodiment of a pressing driven roller.

FIG. 7 is a perspective view of a pressing driven roller 57 according to a third embodiment of the invention. FIG. 8 is a perspective view of a pressing driven roller 57 according to a fourth embodiment of the invention. The pressing driven roller 57 according to the third embodiment, as shown in the drawing, has a shaft portion 573, both ends of which are tapered to reduce the diameters toward both distal ends thereof (see FIG. 7). On the other hand, the pressing driven roller 57 according to the fourth embodiment, as shown in the drawing, has first shaft portions 574 that have larger diameters and second shaft portions 575 that have smaller diameters so as to form the shape of the shaft portion such that both distal ends of the shaft portion are smaller in diameter than the proximal ends thereof. Thus, when the shaft portions adjacent to the rotary body 571 are thick and are tapered to reduce their diameters toward the outside, it is possible to reliably restrict inclination of the rotary body 571 by stably supporting the attitude of the rotary body 571. Hence, for example, it may be expected that the pressing driven roller 57 is stably driven.

Figure 9:
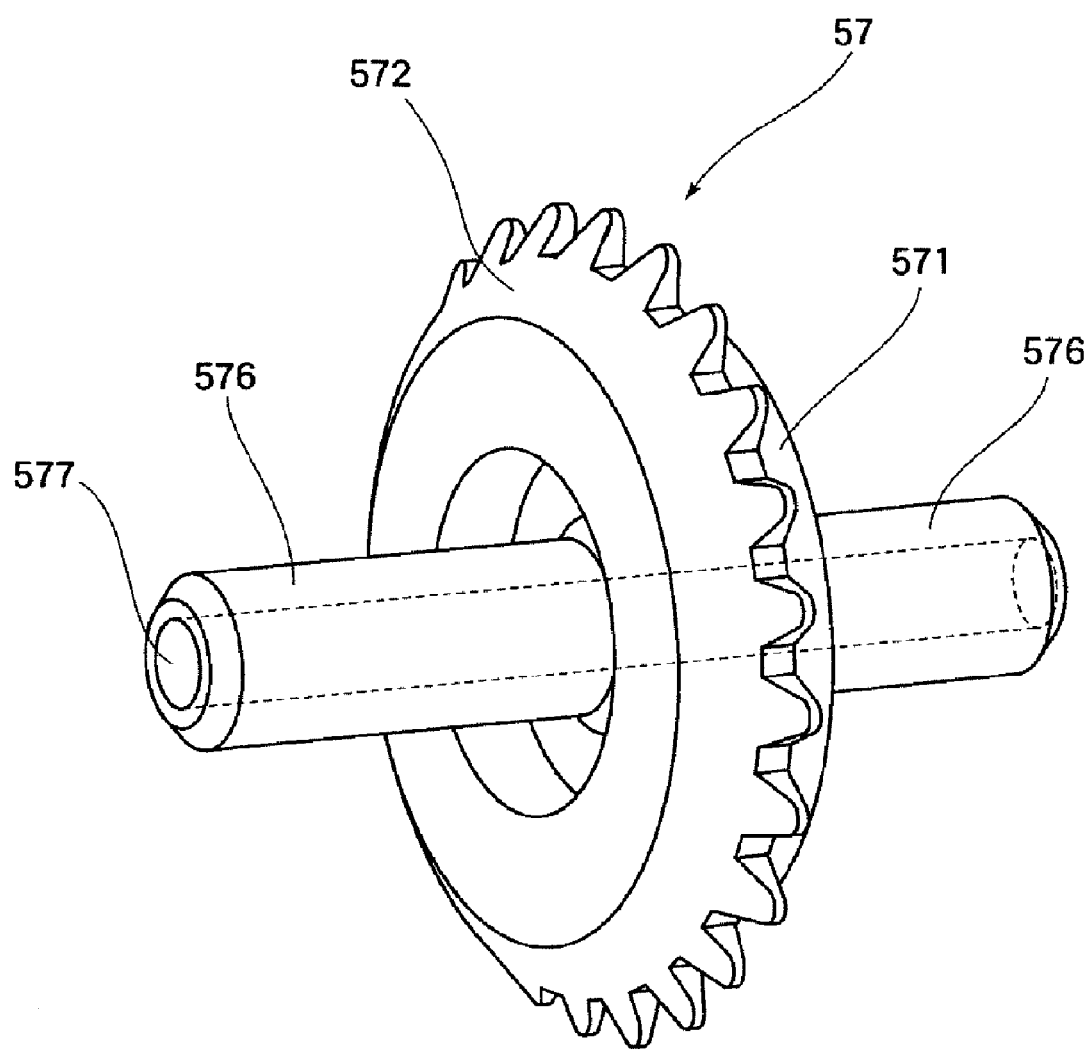
FIG. 9 is an exterior perspective view showing a fifth embodiment of a pressing driven roller.

FIG. 9 is a perspective view of a pressing driven roller 57 according to a fifth embodiment of the invention. The pressing driven roller 57 according to the fifth embodiment, as shown in the drawing, has a substantially cylindrical shaft portion 576 having a through-hole 577 formed therein. The thus shaped shaft portion 576, when the inner diameter of the through-hole 577 is adjusted, allows a pressing force of the shaft portion 576 to be adjusted while the diameter and length of the shaft portion 576 remain unchanged. In other words, it is advantageous in that the pressing force of the pressing driven roller 57 may be arbitrarily set without any change in outer shape of the pressing driven roller 57.

The invention is not limited to the embodiments described above, but it may be modified into various alternative embodiments within the scope of the invention as set forth in the appended claims and, of course, the invention also encompasses these alternative embodiments.

What is claimed is:

1. A transported medium transporting apparatus, comprising:
    a transported medium transporting device that transports a transported medium in a predetermined transportation direction; and
    at least one pressing driven roller that is driven so that the pressing driven roller contacts one surface of the transported medium, which is transported by the transported medium transporting device; and
    a pressing driven roller holder, wherein
    the pressing driven roller includes a rotary body and a shaft portion, both of which are made of elastic synthetic resin and formed integrally with each other, wherein a plurality of protrusions are formed on the rotary body at regular intervals in a circumferential direction of the rotary body, wherein the shaft portion rotatably supports the rotary body so that the rotary body can be driven, and wherein the pressing driven roller has a shape such that the rotary body contacts the transported medium with a predetermined pressing force owing to an elastic force of the shaft portion,
    wherein the pressing driven roller holder includes an engaging portion which rotatably supports the shaft portion of the pressing driven roller while maintaining a clearance between the shaft portion and the pressing driven roller holder, and
    wherein the pressing driven roller contacts the transported medium with a predetermined pressing force without a corresponding drive roller being formed opposite to the pressing driven roller.

2. A recording apparatus comprising:
    the transported medium transporting apparatus according to claim 1, wherein
    the recording apparatus includes a recording medium transporting device that transports a recording medium in a predetermined transportation direction and a record performing device that performs recording on a record surface of the recording medium that is placed in a transportation path along which the recording medium transporting device transports the recording medium.

3. The recording apparatus according to claim 2, wherein the pressing driven roller is arranged between a record performing region where the record performing device performs recording and a discharge device that discharges the recording medium that has been recorded.

4. The recording apparatus according to claim 2, wherein a plurality of the pressing driven rollers are arranged at predetermined intervals in a direction perpendicular to the transportation direction of the recording medium and are arranged at corresponding positions that contact crests of waves of wavy deformation of the recording medium, which are formed due to a cockling phenomenon in a direction perpendicular to the transportation direction of the recording medium.

* * * * *

UNITED STATES PATENT AND TRADEMARK OFFICE
CERTIFICATE OF CORRECTION

PATENT NO. : 7,971,990 B2
APPLICATION NO. : 11/832783
DATED : July 5, 2011
INVENTOR(S) : Takuya Terao et al.

It is certified that error appears in the above-identified patent and that said Letters Patent is hereby corrected as shown below:

Title Page,

Please insert:
item --(30)    Foreign Application Priority Data
August 3, 2006 (JP) 2006-212135--

Signed and Sealed this
Thirty-first Day of January, 2012

David J. Kappos
*Director of the United States Patent and Trademark Office*

UNITED STATES PATENT AND TRADEMARK OFFICE
CERTIFICATE OF CORRECTION

PATENT NO. : 7,971,990 B2
APPLICATION NO. : 11/832783
DATED : July 5, 2011
INVENTOR(S) : Takuya Terao et al.

It is certified that error appears in the above-identified patent and that said Letters Patent is hereby corrected as shown below:

Title Page,

Please insert:
item --(30)   Foreign Application Priority Data
August 3, 2006 (JP) 2006-212134--

This certificate supersedes the Certificate of Correction issued January 31, 2012.

Signed and Sealed this
Fourteenth Day of August, 2012

David J. Kappos
*Director of the United States Patent and Trademark Office*